United States Patent
Kim

(10) Patent No.: US 6,206,123 B1
(45) Date of Patent: Mar. 27, 2001

(54) AUTOMATIC CRUISE CONTROL METHOD FOR VEHICLES

(75) Inventor: Young-Gab Kim, Suwon (KR)

(73) Assignee: Hyundai Motor Company, Seoul (KP)

( * ) Notice: Subject to any disclaimer, the term of this patent is extended or adjusted under 35 U.S.C. 154(b) by 0 days.

(21) Appl. No.: 09/468,001

(22) Filed: Dec. 20, 1999

(30) Foreign Application Priority Data

Jul. 8, 1999 (KR) .................................................. 99-27524

(51) Int. Cl.⁷ .................................................. B60K 31/00
(52) U.S. Cl. ............................................. 180/170; 701/93
(58) Field of Search .................................. 180/178, 179, 180/170, 175; 701/93, 94

(56) References Cited

U.S. PATENT DOCUMENTS 4,658,929 * 4/1987 Katou et al. ........................ 180/175
5,161,634 * 11/1992 Ichihara et al. ..................... 180/179
5,162,998 * 11/1992 Kondo ............................. 364/426.04

\* cited by examiner

Primary Examiner—Brian L. Johnson
Assistant Examiner—G B Klebe
(74) Attorney, Agent, or Firm—Christie, Parker & Hale, LLP

(57) ABSTRACT

An automatic cruise control method for vehicles is initiated by firstly selecting an automatic cruise mode. Then a current vehicle speed is detected and the current vehicle speed is compared with a target speed. Next, a new target speed is obtained according to the comparison and an amount of fuel to be injected is determined according to the new target speed.

10 Claims, 4 Drawing Sheets

[Upward slope]      [Downward slope]

AUTOMATIC CRUISE CONTROL METHOD FOR VEHICLES

BACKGROUND OF THE INVENTION

1. Field of the Invention

The present invention relates to a cruise control method for a vehicle. More particularly, the invention relates to a cruise control method that can improve drive efficiency of a vehicle when the vehicle runs up a slope in an automatic cruise control mode.

2. Description of the Related Art

Generally, in an automatic cruise mode, vehicle speed is maintained at a constant level by an automatic cruise control system.

FIG. 1 shows such a conventional automatic cruise control system.

An automatic cruise control system comprises a vehicle speed sensor 10 for detecting a vehicle speed, a throttle position sensor 11 for detecting a throttle opening, a cruise switch 12 for setting vehicle speed at a predetermined level according to a driver's will, an electronic control unit 13 for controlling a vehicle speed to the predetermined level by receiving signals from the vehicle speed sensor 10 and the throttle position sensor 11, and a fuel injecting part 14 for injecting fuel according to a control signal transmitted from the electronic control unit 13.

When a cruise control mode is selected by operating the cruise control switch 12, the electronic control unit 13 controls the fuel injection part 14 according to vehicle speed and throttle opening signals transmitted from the vehicle speed and throttle position sensors 10 and 11. That is, by controlling an amount of fuel being injected, the vehicle speed is maintained at a constant level.

FIG. 2 shows graphs illustrating an amount of fuel to be injected with respect to vehicle speeds according to various road conditions during an automatic cruise control mode.

As shown in the drawing, when the vehicle runs on a level ground to point A, since the difference between a current vehicle speed and a target speed is very low, the amount of fuel injected is not varied substantially. That is, the fuel is supplied according to a speed difference between a current speed and a target speed.

However, as the vehicle goes up a slope, since the vehicle speed is reduced, the amount of fuel to be injected is increased. Particularly, when the vehicle reaches a mid-point of the slope, although the amount of fuel delivery is maximized, it is very difficult to increase the vehicle speed to the target speed.

In addition, when the vehicle goes down the slope, since the vehicle speed increases above the target speed, the fuel injection is stopped. In this state, when the vehicle again meets an upward slope, the vehicle speed is reduced since the coasting speed obtained when the vehicle goes down the slope cannot be maintained.

That is, when the vehicle goes up the slope, the vehicle speed is not increased to the target speed even when the fuel is injected at its maximum rate. In addition, when the vehicle goes down the slope, since the coasting speed cannot be maintained, the drive effect in cruise control mode deteriorates.

SUMMARY OF THE INVENTION

The present invention has been made in an effort to solve the above problems.

It is an objective of the present invention to provide a cruise control method for improving drive effect when a vehicle goes up and down hills while in a cruise control mode.

To achieve the above objective, the present invention provides an automatic cruise control method for vehicles, comprising the steps of selecting an automatic cruise mode; detecting a current vehicle speed; comparing the current vehicle speed with a target speed; determining a new target speed according to the comparison; and controlling an amount of fuel to be injected according to the new target speed.

The step of comparing the current vehicle speed with the target speed comprises the step of determining if the current speed is lower than the target speed.

The step of determining a new target speed comprises, if the current speed is lower than the target speed, the steps of obtaining a speed difference between the target speed and the current speed, and establishing the new target speed by adding the speed difference to the target speed.

The amount of fuel to be injected is determined by a value obtained by integrating the new target speed.

The automatic cruise control method may further comprise the step of, if the current speed is higher than the target speed, stopping an injection of fuel.

The automatic cruise control method may further comprise the step of setting a current speed as the new target speed after the step of stopping an injection of fuel.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
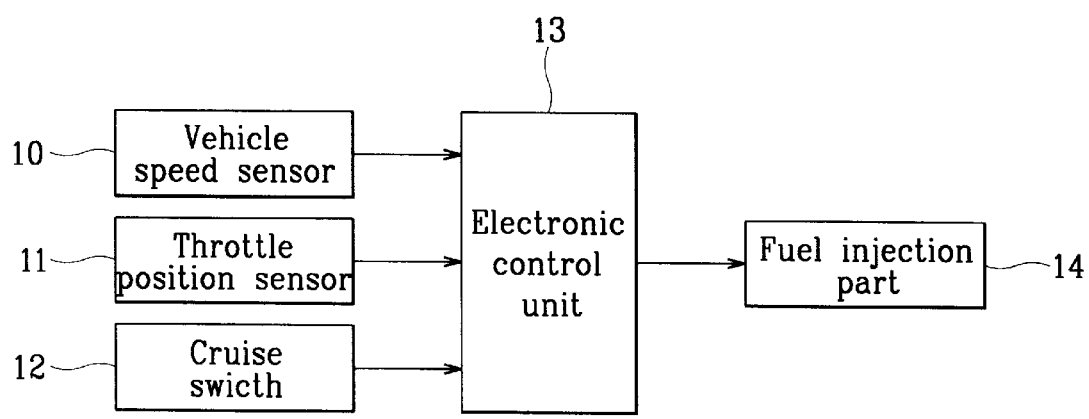
FIG. 1 is a schematic block diagram illustrating a conventional automatic cruise control system.
Figure 2:
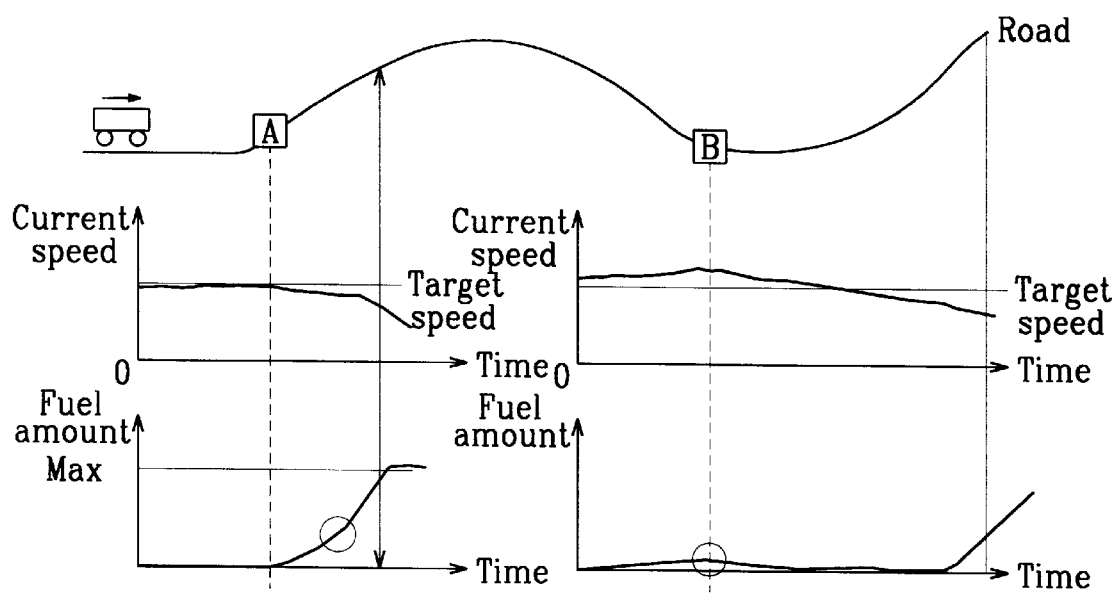
FIG. 2 is graphs illustrating an amount of fuel to be injected with respect to vehicle speeds according to various road conditions using a conventional automatic cruise control system.
Figure 3:
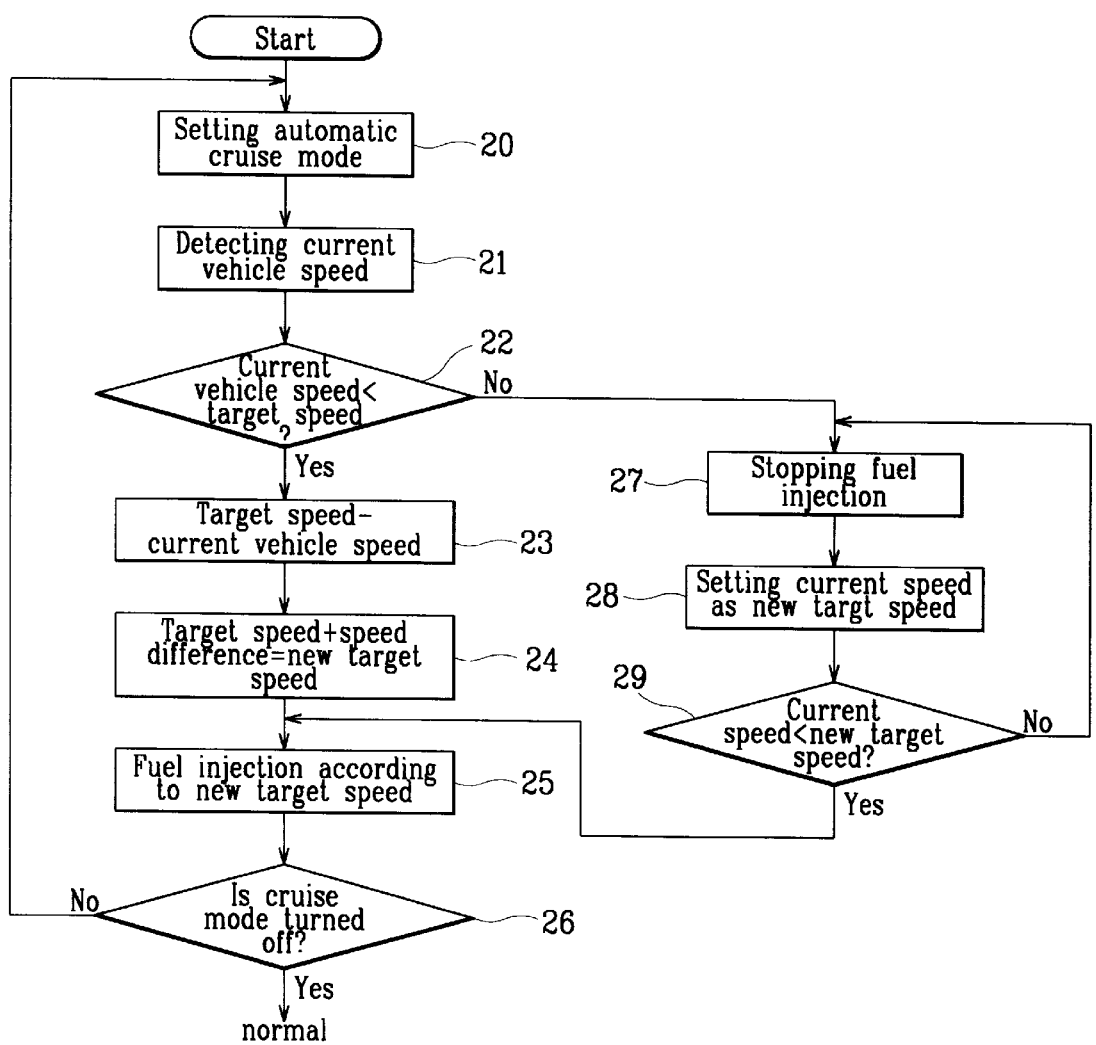
FIG. 3 is a flow chart illustrating a cruise control method according to a preferred embodiment of the present invention.

FIG. 3 shows a flow chart illustrating an automatic cruise control method according to a preferred embodiment of the present invention.

As shown in FIG. 3, when the drive mode is set on an automatic cruise mode (step 20), a current vehicle speed is detected (step 21). In step 22, it is determined whether or not the current vehicle speed is less than a cruise speed (a target speed) set by a driver.

If the current speed is less than the target speed, a speed difference between the current speed and the target speed is calculated in step 23. A new target speed is calculated in step 24 by adding the speed difference determined in step 23 to the previous target speed, and in step 25 fuel is injected according to the new target speed. In step 26, it is determined whether or not the cruise mode is turned off.

If the current speed of step 21 is not less than the target speed, as determined in step 22, fuel injection is stopped in step 27, and in step 28, a new target speed is set at the current speed. In step 29, it is then determined whether or not the new target speed is higher than a current speed. If the new target speed is higher than the current speed, step 25 is implemented so that into the engine for obtaining the new target speed fuel is injected into the engine for obtaining the new target speed. If the new target speed is not found to be higher than the current speed, step 27 is once again invoked.

As described above, when the driver turns on a cruise switch, the electronic control unit 13 begins controlling the vehicle speed in the automatic cruise control mode (step 20).

During automatic cruise control operation, the vehicle speed sensor 10 detects current speed and transmits the corresponding signals to the electronic control unit 13 (step 21).

Then, the electronic control unit 13 determines whether or not the detected current speed is less than the target speed (cruise speed) (step 22). If the current speed is less than the target speed, the electronic control unit 13 determines that the vehicle is encountering resistance as when it goes up a slope, and thus that the vehicle speed is reducing (see FIG. 4). The electronic control unit then calculates a speed difference between the current speed and the target speed using a pre-set program (step 23).

Figure 4:
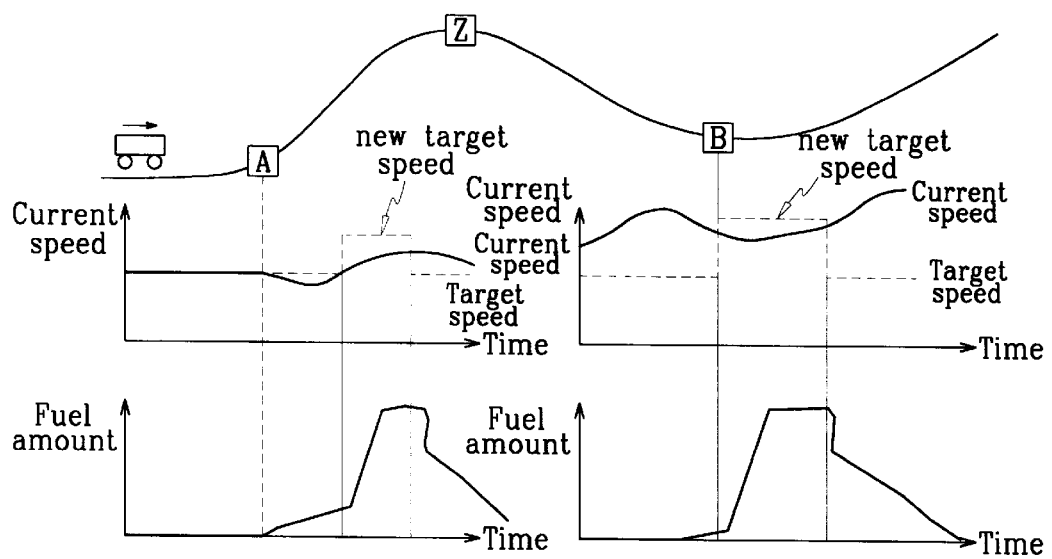
FIG. 4 is graphs illustrating an amount of fuel to be injected with respect to different vehicle speeds according to various road conditions using an automatic cruise control method according to a preferred embodiment of the present invention.

Next, a new target speed is calculated by adding the speed difference to the previous target speed as shown in FIG. 4 (step 24), then fuel is injected by controlling the fuel injection part 14 (step 25). At this point, the amount of fuel to be injected is determined by a value obtained by proportionally integrating the new target speed.

In other words, the fuel injection requirements are calculated for achieving the new target speed. Typically this calculation is accomplished by the electronic control unit 13.

In this state, if the vehicle goes down a slope as shown in FIG. 4, the electronic control unit 13 determines if a current speed detected by the vehicle speed sensor 10 is higher than the target speed (step 22).

If the current speed is higher than the target speed, the electronic control unit 13 determines that the vehicle is going down the slope, and thus that the vehicle speed is increasing. Accordingly, the electronic control unit 13 controls the fuel injection part 14 such that it does not inject fuel (step 27).

In addition, the electronic control unit 13 assigns the current speed as the new target speed (step 28), then, in step 29, determines if the new target speed is higher than a current speed.

If the new target speed is lower than the current speed, the electronic control unit 13 determines that the vehicle is still going down the slope, so it controls the fuel injection part 14 such that it does not inject fuel. If the new target speed is higher than the current speed, the electronic control unit determines that the vehicle is going up the slope, so fuel is injected as in step 25. At this point, the amount of fuel to be injected is determined by a value found by proportionally integrating a final target speed determined as in step 24.

As described above, in the present invention, since the target speed is varied in accordance with road conditions, drive effect of a vehicle in the automatic cruise mode can be greatly improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automatic cruise control method for a vehicle having an engine for providing power to drive the vehicle, the method comprising the steps of:

selecting a target speed for an automatic cruise mode;
   detecting a current vehicle speed;
   comparing the current vehicle speed with the target speed;
   determining a new target speed wherein when the current speed is lower than the target speed the new target speed is set equal to the sum of the target speed and the difference between the target speed and the current speed, and wherein when the current speed is higher than the target speed the new target speed is set equal to the current speed; and
   controlling an amount of fuel to be injected to the vehicle engine for attaining the new target speed.

2. An automatic cruise control method of claim 1 wherein the amount of fuel to be injected is a function of the new target speed.

3. An automatic cruise control method of claim 1 further comprising the step of, if the current speed is higher than the target speed, stopping an injection of fuel.

4. An automatic cruise control method of claim 3 wherein when the current speed is higher than the target speed the new target speed is set equal to the current speed after the step of stopping an injection of fuel.

5. An automatic cruise control method of claim 4 wherein the step of comparing the current speed with a target speed comprises the step of determining if a current speed is lower than the new target speed.

6. An automatic cruise control method of claim 5 wherein the amount of fuel to be injected is a function of the new target speed.

7. An automatic cruise control method for a vehicle having an engine for providing power to drive the vehicle, the method comprising the steps of:

selecting a target speed for an automatic cruise mode;
   detecting a current vehicle speed;
   comparing the target speed to the current speed;
   setting a new target speed greater than the target speed when the current speed is lower than the target speed,
   controlling an amount of fuel to be injected to the vehicle engine for attaining the new target speed;
   stopping the fuel injection to the engine, and
   setting a new target speed lower than the target speed when the current speed is higher than the target speed; and
   providing fuel injection to the engine for attaining the new target speed when the new target speed is greater than the current speed.

8. An automatic cruise control method of claim 7 wherein when the current speed is lower than the target speed, the new target speed is set to equal the sum of the target speed and the difference between the target speed and the current speed.

9. An automatic cruise control method of claim 7 wherein when the current speed is higher than the target speed, the new target speed is set equal to the current speed.

10. An automatic cruise control method for a vehicle having a driving means tor driving the vehicle, the method comprising the steps of:

selecting a target speed for an automatic cruise mode;

detecting a current vehicle speed;

comparing the current vehicle speed with the target speed;

determining a new target speed wherein when the current speed is lower than the target speed the new target speed is set equal to the sum of the target speed and the difference between the target speed and the current speed, and wherein when the current speed is higher than the target speed than the new target speed is set equal to the current speed; and controlling the driving means for attaining the new target speed.

* * * * *